United States Patent
Abel et al.

(10) Patent No.: US 6,910,779 B2
(45) Date of Patent: Jun. 28, 2005

(54) VEHICLE MIRROR

(75) Inventors: Heinz-Bernhard Abel, Grossostheim (DE); Coloman Lenart, Pfungstadt (DE); Mathias Polz, Dauernheim (DE); Heinrich von Holleben, Wächtersbach (DE); Yorek Biener, Gross Umstadt (DE); Heinrich Noll, Gross-Umstadt (DE); Andreas Vollmer, Mainhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/227,024

(22) Filed: Aug. 22, 2002

(65) Prior Publication Data

US 2003/0086192 A1 May 8, 2003

(30) Foreign Application Priority Data

Aug. 24, 2001 (DE) .......................... 101 40 689

(51) Int. Cl.$^7$ ............................. G02B 27/14

(52) U.S. Cl. ........................ 359/839; 359/630; 345/46
(58) Field of Search ............................. 345/7, 8, 9, 44, 345/46; 359/265, 267, 839, 872, 603, 629, 630, 634; 340/815.4

(56) References Cited

U.S. PATENT DOCUMENTS

| 6,106,121 A | * | 8/2000 | Buckley et al. ............. 359/839 |
| 6,512,624 B2 | * | 1/2003 | Tonar et al. ................ 359/265 |
| 2002/0044065 A1 | * | 4/2002 | Quist et al. ............. 340/815.4 |

FOREIGN PATENT DOCUMENTS

| DE | 29623741 | 10/1999 |
| WO | 0023826 | 4/2000 |

* cited by examiner

Primary Examiner—Mark A. Robinson
(74) Attorney, Agent, or Firm—Martin A. Farber

(57) ABSTRACT

A vehicle mirror has a mirror glass (1) which also forms a substrate for an OLED display (7). This OLED display (7) fully covers the mirror glass (1). A front cover glass (5) forms the second substrate for the OLED display (7).

10 Claims, 1 Drawing Sheet

VEHICLE MIRROR

FIELD AND BACKGROUND OF THE INVENTION

The invention relates to a vehicle mirror with a mirror glass and an organic light emitting display, formed by two substrates and an OLED layer.

Vehicle mirrors of the above type are known, since it is mentioned in the literature that OLED displays can be applied to vehicle windows, vehicle mirrors or other components of motor vehicles. It is particularly emphasized, in this case, that such OLED displays are flexible and can adapt to the contour of the component in question. OLED displays can be configured as nontransparent and transparent displays. The transparent OLED display has the advantage, over conventional liquid crystal displays, that it has a transmission of approximately 80% in the inoperative state. The reflective visibility conditions are therefore substantially unrestricted by such a display. In contrast to this, the transmission of liquid crystal displays is only 5–18% in the case of a passive matrix, and approximately 5% in the case of TFT color displays, so that such displays must not cover a sizeable reflection surface on motor vehicle mirrors.

If an OLED display is applied to a vehicle mirror, then the light to be reflected needs to pass first through the OLED display and then through the mirror glass onto the reflection surface, and then back again through the mirror glass and the OLED display. At a non-normal observation angle, considerable parallax of the reflected image occurs. Vehicle mirrors always involve a non-normal viewing direction. It is therefore an object of the invention to configure a vehicle mirror of the type mentioned in the introduction such that it has the least possible parallax.

SUMMARY OF THE INVENTION

This object is achieved according to the invention in that the mirror glass also forms one of the substrates of the OLED display.

This configuration of the vehicle mirror reduces the number of glasses by one. The layer system which the light needs to penetrate is therefore thinner overall, so that a smaller parallax error occurs. Furthermore, irregularities in the individual transparent glasses have less of an effect. The invention does not provide an exterior mirror that has an OLED display, but rather it provides a reflecting OLED display.

Since transparent OLED displays have a transmission of approximately 80%, the OLED display can be made to extend over the entire surface of the mirror glass without compromising the reflecting function of the vehicle mirror. This provides the opportunity to implement very large area representations by means of the OLED display, so that they can be seen reliably by the driver. If the representation of the OLED display overlaps partially with the reflected image, the driver can simultaneously observe the rear area and receive information, for example warning signals or outside temperature indications. In this way, the information content of the reflected image can advantageously be supplemented and reinforced by additional information.

It is particularly cost-effective, according to one refinement of the invention, for the mirror glass to form the back substrate.

Since an OLED display can have a high luminosity in the operative state, for which reason it is often actually used as a lamp for the back-lit illumination of displays, according to another refinement of the invention the reflection surface may form a semitransparent mirror and also the front substrate of the OLED display.

The reflecting action of semitransparent mirrors may be particularly effective, without a separate optically opaque layer needing to be provided behind it, if the OLED display is nontransparent in the inoperative state.

The invention also permits a vehicle mirror to be made active only on demand, by designing the vehicle mirror as a dynamic vehicle mirror that reflects only when the OLED display is operated.

Spectrally selective reflection of information is also possible in this invention if the vehicle mirror is designed as a dielectric vehicle mirror that reflects only selected wavelengths.

If the vehicle mirror is being used as an exterior mirror for a motor vehicle, traffic safety can be improved substantially by the OLED display if the OLED display of the vehicle mirror is designed in combination with a sensitive element to represent an overtaking vehicle situated in the blind spot.

The invention also permits the reflection surface to be replaced completely by an OLED display if the image of the rear area is recorded by an optically sensitive element and is represented in the OLED display.

An improvement in traffic safety is likewise obtained if, according to another refinement of the invention, the OLED display is designed to represent the distance of a vehicle driving in front.

The invention also permits the reflection surface to be replaced completely by an OLED display if the image of the rear area is recorded by an optically sensitive element and is represented in the OLED display.

Another advantageous refinement of the invention is for its OLED display to be designed in combination with a sensitive element to represent information related to the content of the reflection information. By means of this, for example, in relation to an overtaking vehicle that is visible in the rear-view mirror, the distance and/or speed of the overtaking vehicle can be represented in the display of the rear-view mirror.

Figures 1, 2:
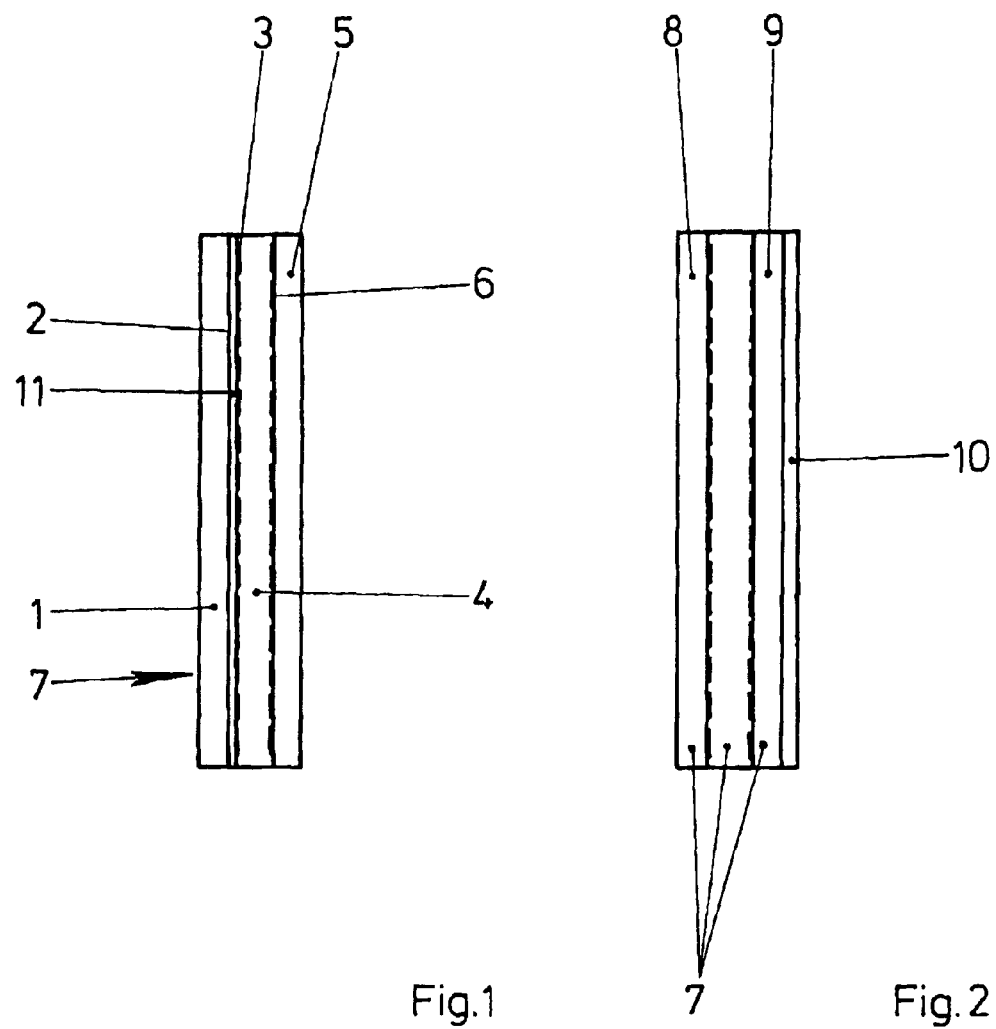
FIG. 1 is a left side view of the vehicle mirror of the present invention.
FIG. 2 is a left side view of the vehicle mirror of the present invention.

The invention covers various exemplary embodiments. To further illustrate its basic principle, two layer systems for a vehicle mirror are shown in section in the drawing and will be described below, in both cases with the left-hand side of the layer system being the side facing away from the observer.

DETAILED DESCRIPTION OF THE PREFERRED EMBODIMENT

FIG. 1 shows a reflection surface 1 with a 100% reflecting mirror layer 2, an insulator layer 11 with electrodes 3 and an OLED layer 4, electrodes 6 and a cover glass 5 on top. What is important for the invention is that the reflection surface 1 with the mirror layer 2, and also the cover glass 5, should form the substrates of an OLED display 7. A vehicle mirror that has an OLED display is therefore not provided, but rather a reflecting OLED display is provided.

In the exemplary embodiment according to FIG. 2, the OLED display is constructed in the customary fashion. It is not, however, a nontransparent OLED display. Its two substrates 8, 9 merely have substrate functions. There is a semitransparent mirror 10 on the front substrate 9.

We claim:

1. A vehicle mirror system comprising an organic light emitting display, wherein the display includes a first substrate, a second substrate, and an OLED layer disposed between the first substrate and the second substrate, wherein the first substrate has a reflecting surface to serve as a mirror glass of the mirror system, and wherein the display further comprises electrodes located on opposite sides of the OLED layer contiguous to the OLED layer and to the first and the second substrates, respectively.

2. The vehicle mirror system as claimed in claim 1, wherein the OLED display (7) extends over the entire surface of the mirror glass (1).

3. The vehicle mirror system as claimed in claim 1, wherein the mirror glass (1) forms a rear substrate.

4. The vehicle mirror system as claimed in claim 1, wherein the mirror glass forms a semi-transparent mirror (10) and also a front substrate (9) of the OLED display (7).

5. The vehicle mirror system as claimed in claim 1 wherein the vehicle mirror system is a dielectric vehicle mirror system reflecting only selected wave lengths.

6. The vehicle mirror system as claimed in claim 1, wherein said OLED display (7) in combination with a sensitive element represents an overtaking vehicle situated in a blind spot.

7. The vehicle mirror system as claimed in claim 1, wherein the OLED display (7) represents distance of a vehicle driving ahead.

8. The vehicle mirror system as claimed in claim 1, wherein said OLED display (7) in combination with a sensitive element represents information related to content of reflection information.

9. The vehicle mirror system as claimed in claim 1, wherein the reflecting surface of the first substrate faces the OLED layer, thereby attaining reduced parallax in use of the mirror system.

10. The vehicle mirror system as claimed in claim 1, wherein the electrodes located on the side of the OLED layer facing the first substrate are disposed in an insulator layer.

* * * * *